US007184955B2

(12) United States Patent
Obrador et al.

(10) Patent No.: US 7,184,955 B2
(45) Date of Patent: Feb. 27, 2007

(54) SYSTEM AND METHOD FOR INDEXING VIDEOS BASED ON SPEAKER DISTINCTION

(75) Inventors: Pere Obrador, Mountain View, CA (US); Tong Zhang, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 704 days.

(21) Appl. No.: 10/106,973

(22) Filed: Mar. 25, 2002

(65) Prior Publication Data

US 2003/0182118 A1 Sep. 25, 2003

(51) Int. Cl.
G10L 15/00 (2006.01)

(52) U.S. Cl. .................. 704/231; 704/233; 715/516
(58) Field of Classification Search .............. 704/231, 704/270, 278; 725/14; 715/516, 705; 707/6; 84/609
See application file for complete search history.

(56) References Cited

U.S. PATENT DOCUMENTS

| 5,553,289 | A | * | 9/1996 | Johnson et al. | 715/705 |
|---|---|---|---|---|---|
| 5,616,876 | A | * | 4/1997 | Cluts | 84/609 |
| 5,664,227 | A | * | 9/1997 | Mauldin et al. | 715/516 |
| 5,757,417 | A | * | 5/1998 | Aras et al. | 725/14 |
| 5,983,176 | A | * | 11/1999 | Hoffert et al. | 704/231 |
| 6,317,711 | B1 | | 11/2001 | Muroi | 704/253 |
| 6,363,380 | B1 | * | 3/2002 | Dimitrova | 707/6 |

OTHER PUBLICATIONS

Patel N V et al: "Video Classification Using Speaker Identification" Storage and Retrieval for Image and Video Database 5, San Jose, Feb. 13–14, 1997 Proceedings of Spie, Bellingham, SPIE, US vol. 3022, pp. 218–225.

Tsekeridou S et al: Speaker dependent video indexing based on audio–visual Interaction. Image Processing 1998 International Conference on Chicago, Il. Oct. 4–7, 1998, Los Alamitos, CA USA. pp. 358–362, XP010308791.

Makhoul J et al: "Speech and Language Technologies for Audio Indexing and Retrieval" Proceedings of the IEE, IEEE New York, US, vol. 88, No. 8, Aug. 2000 pp. 1338–1353, XP001157800.

Nam J et al: "Speaker Indentification and video analysis for hierarchical video shot classification" Image Processing, 1997. Proceedings International Conference on Santa Barbara, CA, US Oct. 26–29, 1997 pp. 550–553, XP010254004.

Douglas A. Reynolds and Richard C. Rose, "Robust Text–Independent Speaker Identification Using Gausssian Mixture Speaker Models", IEEE Transactions on Speech and Audio Processing, vol. 3, No. 1, Jan. 1995, pp. 72–83.

Herbert Gish and Michael Schmidt, "Text–Independent Speaker Identification", IEEE Signal Processing Magazine, Oct. 1994, pp. 18–32.

* cited by examiner

*Primary Examiner*—David D. Knepper

(57) ABSTRACT

A system and method for indexing multimedia files utilizes audio characteristics of predefined audio content contained in selected multimedia segments of the multimedia files to distinguish the selected multimedia segments. In the exemplary embodiment, the predefined audio content is speech contained in video segments of video files. Furthermore, the audio characteristics are speaker characteristics. The speech-containing video segments are detected by analyzing the audio contents of the video files. The audio contents of the speech-containing video segments are then characterized to distinguish the video segments according to speakers. The indexing of speech-containing video segments based on speakers allows users to selectively access video segments that contain speech from a particular speaker without having to manually search all the speech-containing video segments.

28 Claims, 6 Drawing Sheets

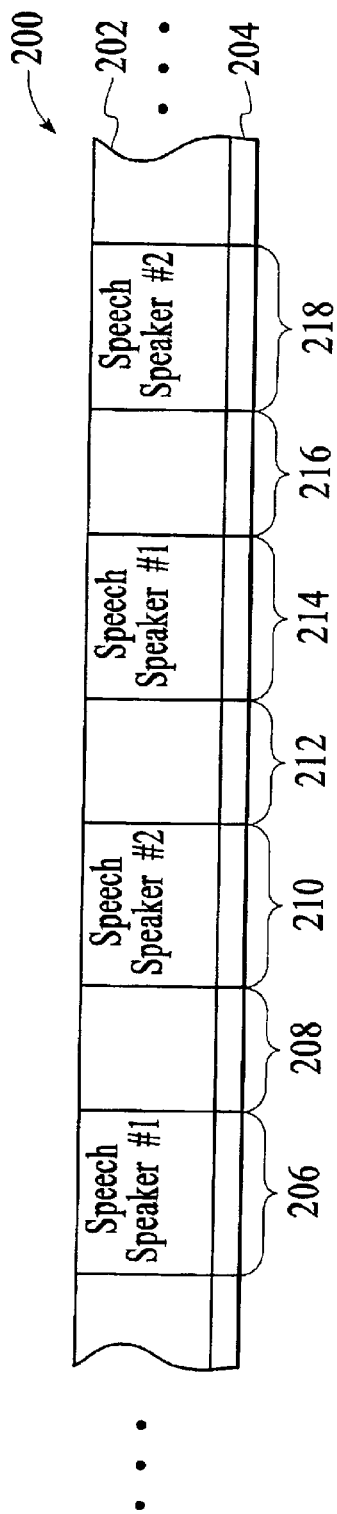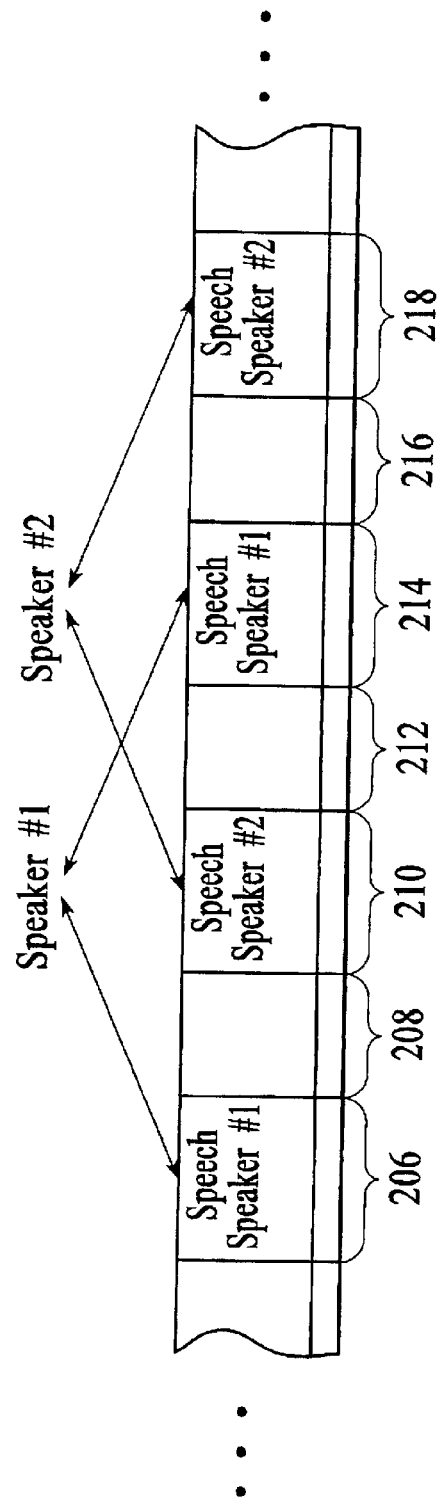

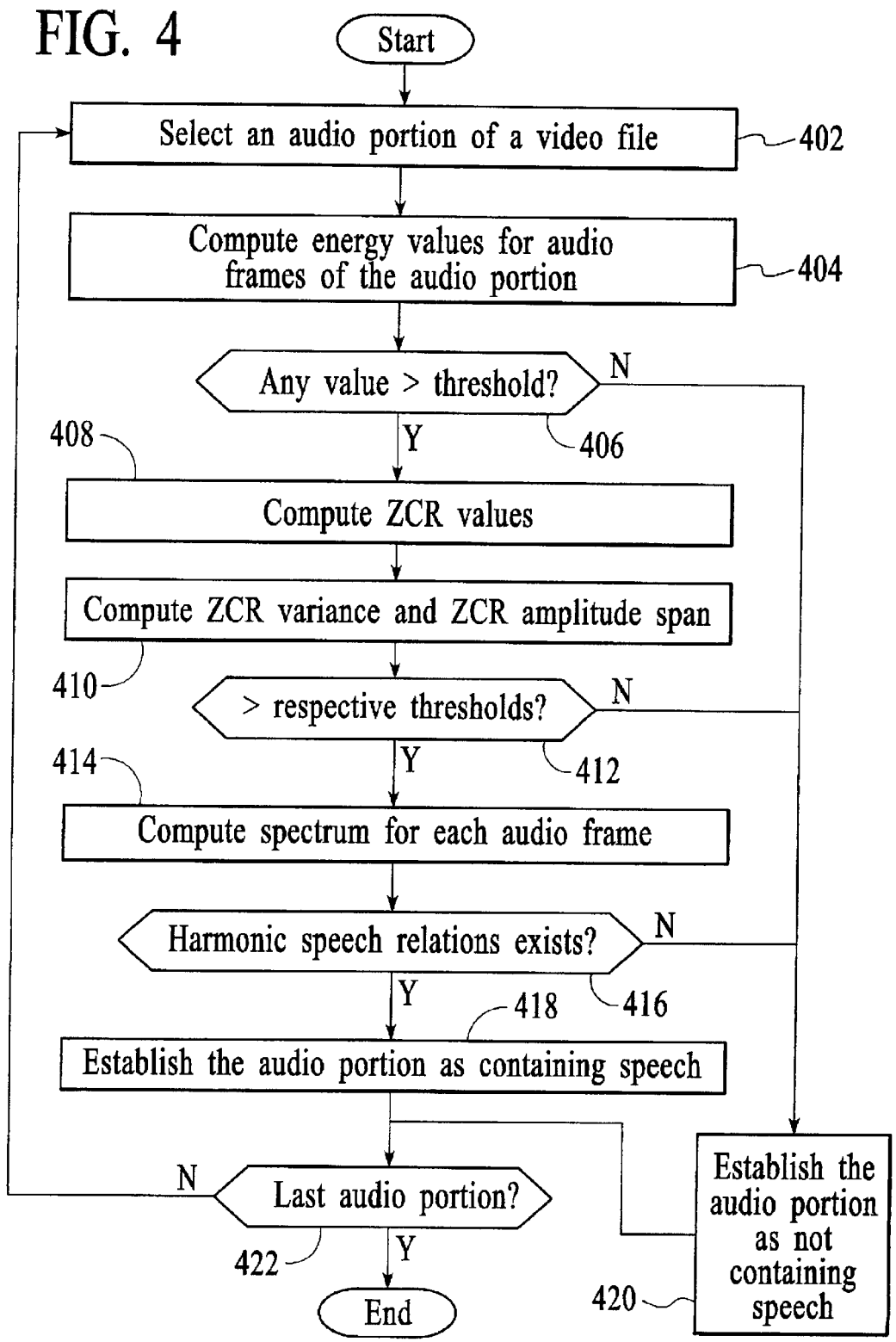

SYSTEM AND METHOD FOR INDEXING VIDEOS BASED ON SPEAKER DISTINCTION

FIELD OF THE INVENTION

The invention relates generally to video processing, and more particularly to a system and method for indexing videos.

BACKGROUND OF THE INVENTION

The popularity of video cameras has increased in recent years due to progressive price reductions. Most video cameras use magnetic videotapes to store captured video scenes in analog or digital format. Magnetic videotapes are relatively inexpensive and can store a large quantity of video. A single magnetic videotape may include multiple video scenes. A video scene may be defined as a video sequence having a common subject over a contiguous period of time and space. Therefore, a video scene contains a story or at least contains an independent semantic meaning. A video scene can include one or more video shots. A video shot is a video segment captured continuously over a period of time.

The use of magnetic videotapes does have some disadvantages over other forms of video storage. One of the main disadvantages is that retrieving one or more desired video scenes or shots can be a challenging task. Since captured video scenes are linearly stored on videotape with respect to time, a user may have to search the entire videotape to find a desired video scene or shot. The difficulty in finding a desired video scene or shot is compounded when there are multiple videotapes that may contain the desired video scene or shot.

One solution to more easily retrieve desired video scenes or shots from videotapes is to transfer the contents of the videotapes to a video indexing device, such as a personal computer with a video indexing software. If the video scenes are stored in videotapes in an analog format, then the video scenes are first converted into a digital format. In the digital format, video indices can be generated to "mark" the different video scenes and shots. These video indices can be generated automatically using a conventional video indexing algorithm. The video indexing algorithm may detect visual changes between video scenes and shots to identify and index the video scenes and shots. The video indexing algorithm may also select a significant video frame ("keyframe") from each video scene that best represent that video scene. Similarly, the video indexing algorithm may also select a keyframe from each video shot that best represent that video shot. A single keyframe may represent both a video scene and a video shot of the scene. The keyframes for the video scenes and shots are subsequently presented to the user so that desired video scenes or shots can be easily retrieved.

A concern with the conventional video indexing algorithm is that the indexed video scenes and shots cannot be retrieved based on audio content. Since video scenes and shots are indexed according to visual information, a user cannot selectively retrieve video segments, which may be video scenes, video shots or other portions of video, that include desired audio content, such as speech from a particular speaker. In many situations, a user may want to retrieve only video segments during which a particular speaker is talking. With the conventional video indexing algorithm, if the keyframes do not provide any visual indication of a desired speaker, then the user cannot select the video scenes or shots that contain speech from that speaker. In addition, since the conventional video indexing algorithm uses only visual information, the indexed video scene or shot may or may not contain speech. Even if a video scene or shot contains speech from a desired speaker, only a small segment of the video scene or shot may contain speech of that speaker. Thus, the user may have to unnecessarily watch the entire video scene or shot.

In view of the above-described concern, there is a need for a system and method for indexing videos based on audio information contained in the videos.

SUMMARY OF THE INVENTION

A system and method for indexing multimedia files utilizes audio characteristics of predefined audio content contained in selected multimedia segments of the multimedia files to distinguish the selected multimedia segments. In the exemplary embodiment, the predefined audio content is speech contained in video segments of video files. Furthermore, the audio characteristics are speaker characteristics. The speech-containing video segments are detected by analyzing the audio contents of the video files. The audio contents of the speech-containing video segments are then characterized to distinguish the video segments according to speakers. The indexing of speech-containing video segments based on speakers allows users to selectively access video segments that contain speech from a particular speaker without having to manually search all the speech-containing video segments.

A system for indexing video files in accordance with the invention includes a speech detector, a speaker distinction module and a processor. The speech detector is configured to detect speech-containing video segments of a video file. The speaker distinction module is configured to classify the speech-containing video segments according to speaker characteristics of the speech contained in the video segments. The processor is configured to generate indices of locations of the speech-containing video segments according to speaker characteristics classifications.

In an embodiment, the speech detector includes an energy analyzer, a zero-crossing analyzer and/or a spectrum analyzer. The energy analyzer is configured to compare energy values of audio portions of the video file to screen the audio portions that do not contain speech. The zero-crossing analyzer is configured to compare zero-crossing rate (ZCR) variance values and ZCR amplitude span values of the audio portions to corresponding thresholds to further screen the audio portions that do not contain speech. The spectrum analyzer is configured to check for harmonic speech relations in peaks of spectrums for the audio portions of the video file to determine whether the audio portions include speech.

In an embodiment, the speaker distinction module includes a feature generator, a modeling unit and a clustering unit. The feature generator is configured to generate spectral-based feature coefficients for audio portions of the speech-containing video segments. The spectral-based feature coefficients may be mel-frequency cepstral coefficients. The modeling unit is configured to model the spectral-based feature coefficients for the speech-containing video segments into audio models. The clustering unit is configured to cluster the audio models of the speech-containing video segments to classify the speech-containing video segments according to speaker characteristics.

A method for indexing video files in accordance with the invention includes the steps of detecting speech-containing video segments of a video file, classifying the speech-containing video segments according to speaker characteristics, and generating indices of locations of the speech-containing video segments in the video file according to speaker characteristics classifications.

In an embodiment, the step of detecting the speech-containing video segments includes comparing energy values of audio portions of the video file to an energy threshold to screen the audio portions that do not contain speech. In addition, the step of detecting the speech-containing video segments may include comparing ZCR variance values and ZCR amplitude span values for the audio portions of the video file to further screen the audio portions that do not contain speech. Furthermore, the step of detecting the speech-containing video segments may include checking for harmonic speech relations in peaks of spectrums for the audio portions to determine whether the audio portions include speech.

Other aspects and advantages of the present invention will become apparent from the following detailed description, taken in conjunction with the accompanying drawings, illustrated by way of example of the principles of the invention.

BRIEF DESCRIPTION OF THE DRAWINGS

FIGS. 2A and 2B are representations of a video file, which has been divided into speech-containing video segments and then classified based on speaker distinction.

FIG. 4 is a process flow diagram of the operation of the speech detector.

DETAILED DESCRIPTION

Figure 1:
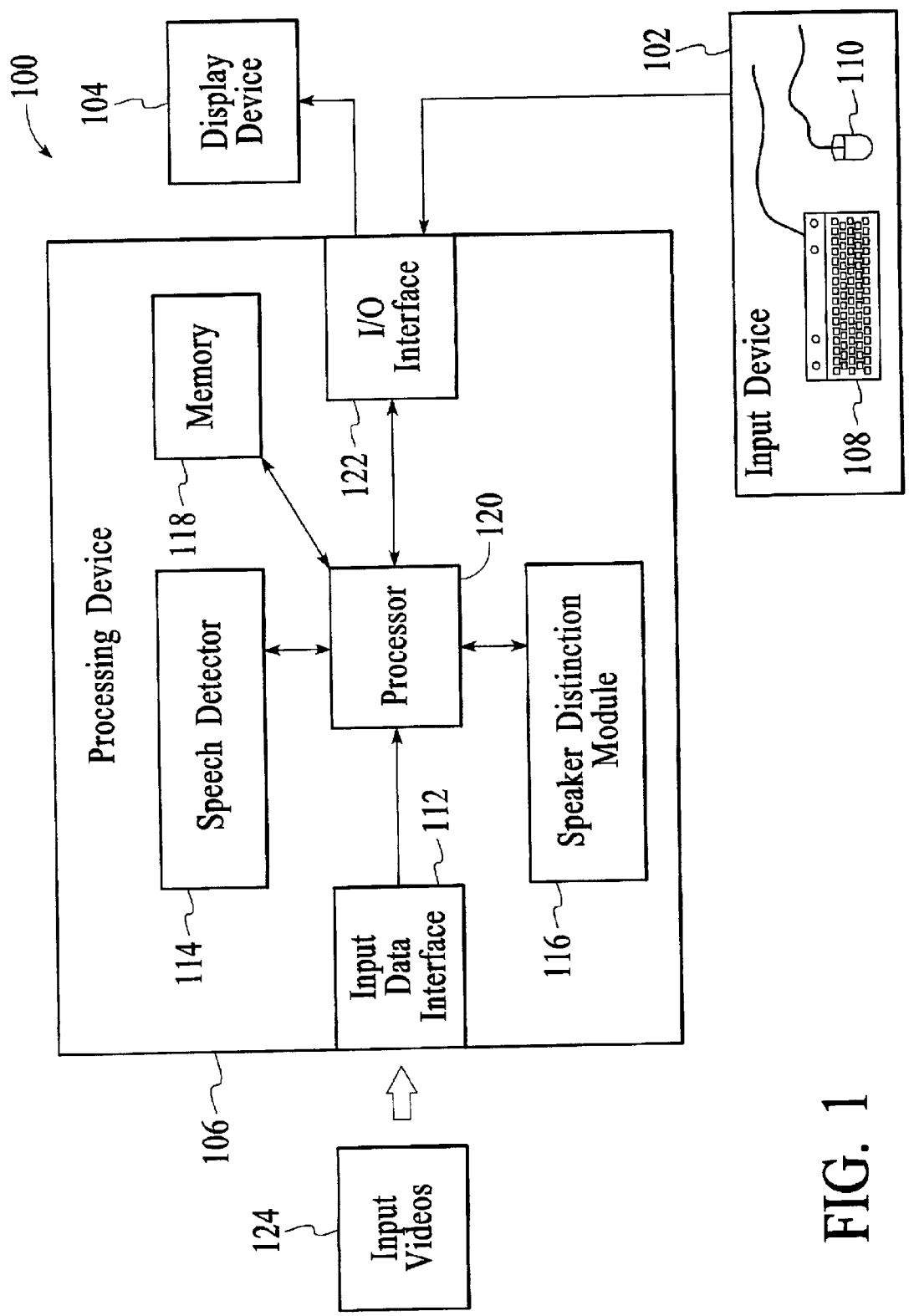
FIG. 1 is a block diagram of a video indexing system in accordance with an exemplary embodiment of the present invention.

With reference to FIG. 1, a video indexing system 100 in accordance with an exemplary embodiment of the invention is shown. The video indexing system operates to index videos based on audio information contained in the videos. In particular, the video indexing system operates to detect speech-containing video segments and then to correlate the speech-containing video segments to different speakers. Thus, the video indexing system allows users to selectively retrieve speech-containing video segments of video data that correspond to a particular speaker in an efficient manner.

As shown in FIG. 1, the video indexing system 100 includes an input device 102, an output device 104 and a processing device 106. Although these devices are illustrated as separate devices, two or more of these devices may be integrated together. The input device 102 allows a user to input commands into the system. In addition, the input device allows the user to input parameters that are used by the system to index videos. In the exemplary embodiment, the input device includes a computer keyboard 108 and a cursor pointing mechanism 110. However, the input device may include any type of electronic input device. In an embodiment in which the input device and the processing device are integrated, the input device may simply be buttons, dials, levers and/or switches on the processing device.

The output device 104 of the video indexing system 100 allows a user to view videos. The output device also allows the user to listen to the accompanying audio contents of the videos. In the exemplary embodiment, the output device includes a computer monitor, such as a CRT monitor or a flat panel display, and one or more speakers. In an embodiment in which the output device and the processing device 106 are integrated, the output device may include a liquid crystal display and one or more speakers, which are attached to the processing device.

The processing device 106 of the video indexing system 100 operates to process videos for video indexing. As shown in FIG. 1, the processing device includes an input data interface 112, a speech detector 114, a speaker distinction module 116, memory 118, a processor 120 and an input/output (I/O) interface 122. Although the speech detector and the speaker distinction module of the processing device are illustrated and described herein as separate units, these components represent functional blocks, and consequently, may or may not be embodied in the form of physically separate units. Thus, these components may be combined into a single module. Alternatively, one or both of these components may be divided into two or more modules. Therefore, the processing device may include fewer or more components than illustrated and described. In the exemplary embodiment, the speech detector and the speaker distinction module are implemented as software in a computer. However, these components may be implemented in any combination of hardware, firmware and/or software.

The input data interface 112 of the processing device 106 provides a means to receive input videos 124 from an external source (not shown), such as a digital video camera, a portable storage medium or a remote computer/server. In the exemplary embodiment, the input data interface is configured to receive digitized videos or digital video files. If the input videos are analog videos, the processing device may include an analog-to-digital video converter (not shown) to convert the received analog videos into digital video files. The input data interface may be a modem, a USB port, a serial port, a FireWire card or any other interface port that is designed to interface the video indexing system 100 to the external source to transfer input videos through a communications link. Alternatively, the input data interface may be a memory slot to receive a portable storage medium, such as a solid-state memory card, that contains one or more input videos as digital video files.

The memory 118, the processor 120 and the I/O interface 122 of the processing device 106 are components that are commonly found in personal computers. The memory 118 is a storage medium to store digital video files. The number of video files that can be stored in the memory is only limited by the storage capacity of the memory. The memory may also store various parameters that are used by the video indexing system 100, as well as other information. The memory may be a hard disk drive, read-only memory (ROM) or other forms of memory. The processor 120 executes signal processing operations in conjunction with the other components of the processing device, as described below. The processor may be any type of digital signal processor. The I/O interface 122 provides an interface between the processing device 106 and the input and output devices 102 and 104.

The speech detector 114 and the speaker distinction module 116 of the processing device 106 operate in conjunction with the processor 120 to first detect speech-containing video segments in a digital video file and then to associate the speech-containing video segments according to speakers. The overall operation of these components is described with reference to FIGS. 2A and 2B. In FIG. 2A, a digital video file 200 is illustrated as a continuous linear tape, which is separated into video data 202 and corresponding audio data 204. The video data 202 corresponds to the visual contents of the video file 200, while the audio data 204 corresponds to the audio contents. The video file has been partitioned into video segments 206-218. The video segments 206, 210, 214 and 218 contain speech, while the video segments 208, 212 and 216 contain other forms of audio contents or no audio contents. The speech-containing video segments 206 and 214 contain speech from speaker #1 and the speech-containing video segments 210 and 218 contain speech from speaker #2. The speech detector 114 is configured to process the video file 200 to detect the speech-containing video segments 206, 210, 214 and 218 by comparing the audio characteristics of the audio data 204 with known speech characteristics. The speaker distinction module 116 is configured to process the speech-containing video segments 206, 210, 214 and 218 to classify the speech-containing video segments according to speakers using speaker distinction features of the audio contents in the video segments. Thus, in the example, the speaker distinction module will associate the speech-containing video segments 206 and 214 together as containing speech from a particular speaker (i.e., the speaker #1) and associate the speech-containing video segments 210 and 218 as containing speech from another speaker (i.e., the speaker #2). Using this information, the processor 120 is able to index the speech-containing video segments 206, 210, 214 and 218 of the video file 200 so that speech-containing video segments associated to a particular speaker can be easily accessed.

Figure 3:
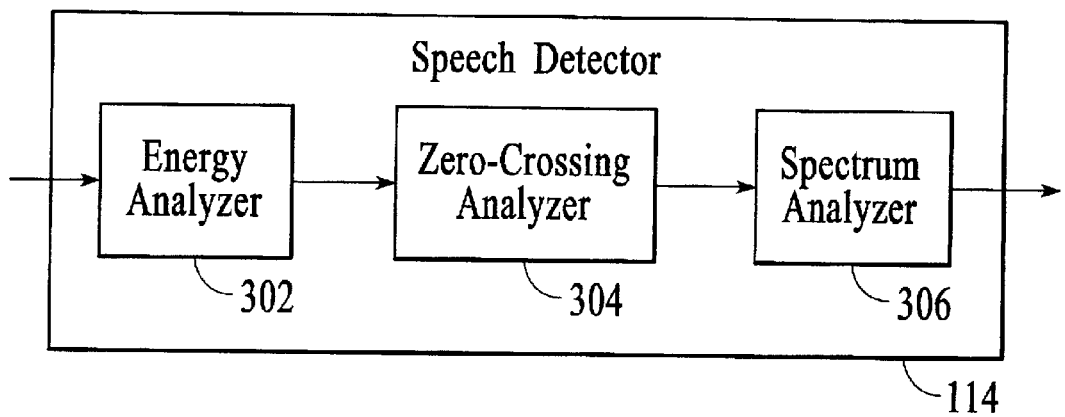
FIG. 3 is a block diagram of components of a speech detector included in the video indexing system of FIG. 1.

As shown in FIG. 3, the speech detector 114 of the processing device 106 includes an energy analyzer 302, a zero-crossing analyzer 304 and a spectrum analyzer 306. The components of the speech detector process small audio portions of a given video file, which are divided into audio frames using overlapping windows, to determine whether the audio portions contain speech. As an example, the audio portions may be 1 or 2 seconds of audio data, and the audio frames may be approximately 10 to 20 milliseconds of audio data. The audio portions are sequentially analyzed by the energy analyzer 302, the zero-crossing analyzer 304 and the spectrum analyzer 306 to identify the audio portions that contain speech in a three-step approach. However, if one of the analyzers determines that a given audio portion does not contain speech, then that audio portion is not processed any further. This three-step approach to determine whether audio portions contain speech ensures that not all audio portions are unnecessarily analyzed by the spectrum analyzer 306 and/or the zero-crossing analyzer 304. Consequently, the speech detector is able to perform speech detection in an efficient manner.

The energy analyzer 306 of the speech detector 114 operates to screen audio portions of a given video file that do not contain speech by looking at the energy of each audio frame of the audio portions. Specifically, the energy analyzer computes energy values of audio frames for a given audio portion, and then, compares the computed energy values with a predetermined minimum energy threshold. In general, speech has energies that are higher than other types of audio contents, such as background noise. Thus, a preliminary determination of whether audio portions of a given video file contain speech can be made by comparing the energy values of the audio frames of the audio portions with the threshold. The minimum energy threshold can be empirically determined using examples of audio portions that contain speech. The minimum energy threshold may be stored in the memory 118 of the processing device 106. If one or more of the computed energy values for a given audio portion are greater than the predetermined minimum energy threshold, then the audio portion is considered a candidate speech-containing audio portion. However, if every energy value for a given audio portion is less than the predetermined minimum energy threshold, then the audio portion is not considered to contain speech. The energy values may be computed using the following formula.

$$E_n = (1/N) \sum_m [x(m) \cdot w(n-m)]^2,$$

where x(m) is the discrete time (digitized) audio sample, m is the time index of the audio sample, n is the time index of the energy, N is the length of the rectangular sampling window, and w(m) is a rectangular window defined by:

$$w(m) = 1 \quad 0 <= m <= N - 1$$
$$w(m) = 0 \quad \text{otherwise}$$

By assuming that the audio signal changes relatively slowly with a small interval, $E_n$ may be computed every 10 to 20 milliseconds, which corresponds to the length of audio frames. For example, if the sampling rate used to capture and digitize the audio data was a sampling rate of 8000 Hz, $E_n$ may be computed for every 100 audio samples.

The zero-crossing analyzer 304 of the speech detector 114 operates to further screen the remaining audio portions by looking at the zero-crossings in each audio frame of the audio portions. Specifically, the zero-crossing analyzer computes average zero-crossing rate (ZCR) values for each audio frame of a given audio portion, and then, computes the variance of ZCR values and the amplitude span of ZCR values for the given audio portion. The computed ZCR variance and amplitude span are then compared to respective thresholds to determine if the current audio portion may contain speech. In the context of discrete time (digitized) audio, a zero-crossing is said to occur if successive samples have different signs. The zero-crossing rate is therefore a simple measure of the frequency content of a signal.

The speech production model, which is a model of the physical process of generating speech, suggests that the energy of voiced speech signals (vowels) is concentrated below 3 kHz because of the spectral fall-off introduced by the glottal wave, whereas most of the energy is found at higher frequencies for unvoiced speech signals (consonants). Since ZCR is a measure of the frequency level, voiced speech components have lower ZCR values while unvoiced speech components have higher ZCR values. Voiced and unvoiced speech components are interleaved with each other in a speech signal. Thus, the ZCR of speech has much higher variance and amplitude span than a ZCR value of some other types of audio contents, such as music. The zero-crossing analyzer 304 utilizes this conclusion to screen the remaining audio portions by comparing the ZCR variance and ZCR amplitude span with predetermined thresholds.

The average ZCR value of an audio frame can be computed using the following equation.

$$Z_n = (1/2) \sum_m \{[\text{sgn}[x(m)] - \text{sgn}[x(m-1)]]\} w(n-m),$$

where:

$$\text{sgn}[x(m)] = 1 \quad x(m) >= 0$$
$$\text{sgn}[x(m)] = 0 \quad x(m) < 0$$

and $$w(m) = 1 \quad 0 <= m <= N - 1$$
$$w(m) = 0 \quad \text{otherwise}$$

Again, N is the length of the rectangular window w(m). Similar to the energy values, the ZCR values can also be computed every 10 to 20 milliseconds.

From the ZCR values, the zero-crossing analyzer 304 computes the variance of ZCR values and the amplitude span of ZCR values for the audio portion. The amplitude span of ZCR values is defined as the distance between the highest ZCR value and the lowest ZCR value in the audio portion. In an alternative configuration, the zero-crossing analyzer may compute the ZCR variance and ZCR amplitude span for a smaller segment of the audio portion. In this alternative configuration, the given audio portion may be divided into smaller segments and the ZCR variance and the ZCR amplitude span may be computed for each segment. In either configuration, each computed ZCR variance is compared with a predetermined ZCR variance threshold. Similarly, each computed ZCR amplitude span is compared with a predetermined ZCR amplitude span threshold. The ZCR variance threshold and the ZCR amplitude span threshold may be determined empirically and stored in the memory 118. If any of the computed ZCR variances and the ZCR amplitude spans for the given audio portion is greater than the respective threshold, then the audio portion is considered a candidate speech-containing audio portion. However, if all of the computed ZCR variances and the ZCR amplitude spans are less than the respective thresholds, the audio portion is not considered to contain speech.

The spectrum analyzer 306 of the speech detector 114 operates to make the final determination whether the screened audio portions do contain speech using spectrum analysis. In operation, the spectrum analyzer first computes the spectrum of each audio frame in a given audio portion. As an example, the spectrum analyzer may apply a fast Fourier transform (FFT) to the audio frames. However, the spectrum analyzer may apply other operations to derive a smoother version of the spectrum or to derive a spectrum in which the frequency peaks are easier to detect. The spectrum analyzer then detects harmonic partials in each spectrum by picking significant peaks in the spectrum. A significant peak is defined herein as a spectrum peak having an amplitude, width and sharpness in predetermined ranges. The spectrum analyzer then checks the significant peaks for harmonic speech relations. That is, the significant spectrum peaks are checked to see if the frequencies of the peaks are integer multiples of a common, fundamental frequency of human voice, which is about 100 to 300 Hz, since harmonic speech signals have peaks at the fundamental frequency and may have peaks at integer multiples of the fundamental frequency. If the frequencies of the significant spectrum peaks are integer multiples of the fundamental frequency of human voice, the audio portion is determined to contain speech. However, if the frequencies of the significant spectrum peaks are not integer multiples of the fundamental frequency of human voice, the audio portion is determined to not contain speech.

Voiced speech components (vowels) and unvoiced speech components (consonants) are interleaved with each other in a speech signal. Therefore, in terms of a temporal pattern, speech may include harmonic partials in a number of consecutive audio frames, with fundamental frequency values being the same or changing gradually. Thus, harmonic partials exist for a number of consecutive audio frames in voiced speech and disappear during unvoiced speech. The harmonic partials then appear again in the next voiced speech. This distinguishing temporal pattern is typical of speech. Thus, the spectrum analyzer 114 utilizes the typical temporal pattern of speech to determine whether a given audio portion contains speech.

Using the final determination of the spectrum analyzer 306, the processor 120 is able to identify the beginnings and the endings of speech-containing video segments by analyzing the audio portions of the video file that were determined to contain speech. The entire audio portions may be used to identify the speech-containing video segments. Alternatively, the audio frames of the audio portions may be used to more precisely identify the beginnings and endings of the speech-containing video segments. The processor may disregard any speech-containing video segments shorter than a predetermined duration (e.g., 1 or 2 second) by merging detection results for neighboring audio portions. The processor may index the speech-containing video segments by generating a computer file that includes indicators or indices for the locations of boundaries of the speech-containing video segments in the video file.

The overall operation of the speech detector 114 to detect speech-containing video segments of a video file is now described with reference to FIG. 4. At step 402, an audio portion of the video file is selected to be processed. Next, at step 404, energy values for every audio frame of the selected audio portion are computed. At step 406, the computed energy values are compared with the predetermined minimum energy threshold. If none of the computed energy values is greater than the threshold, then the process proceeds to step 420, at which the current audio portion is established as not containing speech. However, if any computed energy value is greater than the threshold, then the process proceeds to step 408.

At step 408, ZCR values are computed for the audio frames of the current audio portion. Next, at step 410, the ZCR variance and ZCR amplitude span are computed for the current audio portion. In an alternative configuration, the ZCR variance and the ZCR amplitude span are computed for smaller segments of the current audio portion. At step 412, the ZCR variance and the ZCR amplitude span are compared with the predetermined ZCR variance threshold and the predetermined ZCR amplitude span threshold, respectively. If both of the ZCR variance and amplitude span are less than the respective thresholds, then the process proceeds to step 420, at which the current audio portion is established as not containing speech. However, if one or both of the ZCR variance and amplitude span are greater than the respective thresholds, then the process proceeds to step 414, at which the spectrum is computed for each audio frame of the current audio portion.

Next, at step 416, the significant peaks of the computed spectrums are checked to determine if there are harmonic speech relations. If there are harmonic speech relations for the peaks, then the process proceeds to step 418, at which the current audio portion is established as containing speech. However, if there are no harmonic speech relations, then the process proceeds to step 420, at which the current audio portion is established as not containing speech. Next, at step 422, a determination is made whether the current audio portion is the last audio portion of the video file. If so, then the process comes to an end. However, if the current audio portion is not the last audio portion, then the process proceeds back to step 402, at which the next audio portion of the video file is selected to be processed.

In an alternative embodiment, the video file may first be segmented into predefined video segments or video shots using a video shot detection scheme, such as a video shot detection method based on differences in histograms of consecutive video frames, before speech detection. In this embodiment, the speech detector 114 of the processing device 106 only determines whether a given video shot contains speech using the speech detection method described above.

Figure 5:
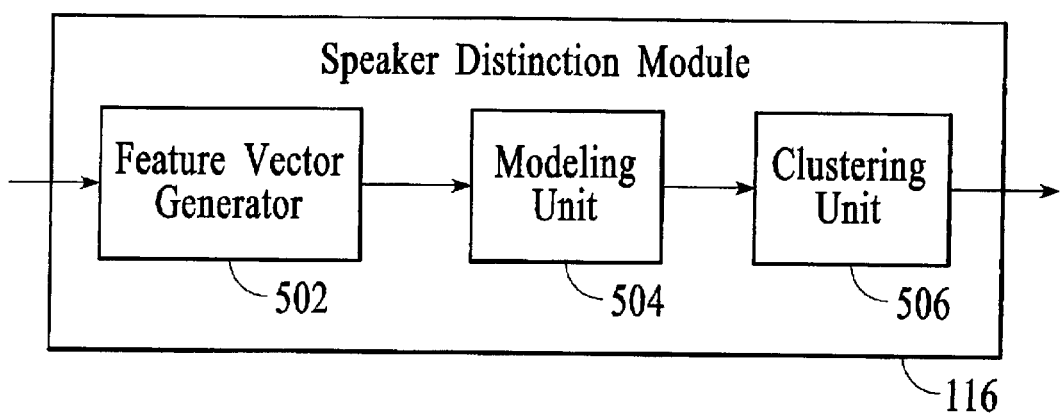
FIG. 5 is a block diagram of components of a speaker distinction module included in the video indexing system of FIG. 1.

Turning now to FIG. 5, the components of the speaker distinction module 116 are shown. As shown in FIG. 5, the speaker distinction module includes a feature vector generator 502, a modeling unit 504 and a clustering unit 506. As stated above, the speaker distinction module operates to correlate the detected speech-containing video segments to different speakers. In the exemplary embodiment, the speaker distinction module does not identify or recognize the different speakers that have been correlated with the speech-containing video segments. However, the results of the speaker distinction module may be used to perform speaker identification.

The feature vector generator 502 of the speech distinction module 116 operates to generate a spectral-based feature vector that characterizes the speech contained in the speech-containing video segments according to speaker features. In the exemplary embodiment, the feature vector generator is configured to generate a feature vector of mel-frequency cepstral coefficients (MFCCs) for each audio segment of a given speech-containing video segment. As an example, an audio segment may be a 20 ms of audio data. Thus, in this example, the feature vector generator processes the audio data of a speech-containing video segment in 20 ms audio segments. The process of generating MFCCs for an audio segment is well known, and thus, is only briefly described herein. A fast Fourier transform (FFT) is applied to a given audio segment to convert the audio segment into the frequency domain. In an embodiment, the results of FTT from the operation of the spectrum analyzer 302 of the speech detector 114 are used. The cepstrum of the audio segment is then computed by taking the FFT inverse of the log magnitude of the FFT, which is mathematically described below.

$$\text{cepstrum(segment)} = FFT^{-1}(\log|FFT(\text{segment})|).$$

The result of the FFT inverse is a feature vector of MFCCs. The feature vector generator 502 then selects a predefined number of MFCCs starting from the first MFCC for further processing. The low MFCCs are selected since these coefficients are more important in representing the cepstrum. As an example, the feature vector generator may only select the first ten MFCCs for further processing. Thus, the feature vector generator outputs a set of MFCCs for each audio segment of a speech-containing video segment. Although the feature vector generator utilizes the MFCCs in the exemplary embodiment, the feature vector generator may use other types of spectral-based features such as perceptual linear predictive coefficients to characterize the speech in the speech-containing video segments.

The modeling unit 504 of the speaker distinction module 116 operates to model the speaker characteristics for each speech-containing video segment using the respective sets of MFCCs. In the exemplary embodiment, the modeling unit utilizes Gaussian mixture model (GMM) to model the speaker characteristics of the speech-containing video segments. The modeling unit generates a Gaussian mixture density value P for each speech-containing video segments, which is the weighted sum of Gaussian distributions, using the following equation.

$$P(\text{video segment}) = \sum_{i=1}^{M} q_i G_i,$$

where M is the number of distributions, which is chosen empirically, $G_i$ is the distribution of common MFCCs for the video segment, and $q_i$ is the weight, which has the following property.

$$\sum_{i=1}^{M} q_i = 1.$$

Parameters of the Gaussian distributions are computed through an optimization procedure so that the Gaussian mixture density value P can get to a global maximum. The resulting set of parameters then represent speaker characteristics of the speech-containing video segment.

The clustering unit 506 of the speaker distinction module 116 operates to cluster the computed Gaussian mixture density parameters to classify the speech-containing video segments into speaker classes such that the video segments that are classified into the same speaker class are considered to contain speech from a common speaker. The clustering unit utilizes a clustering algorithm, such as the nearest-neighbor algorithm, the adaptive sample set construction method, the vector quantization method, etc., to cluster the Gaussian mixture density parameters so that each speech-containing video segment can be associated with a unique speaker.

The classification of the speech-containing video segments can then be used to index the video file according to the speaker classes, which may be performed by the processor 120 of the processing device 106. The processor may associate the indicators or indices for the boundaries of the speech-containing video segments with different speakers, as illustrated in FIG. 2B.

Figure 6:
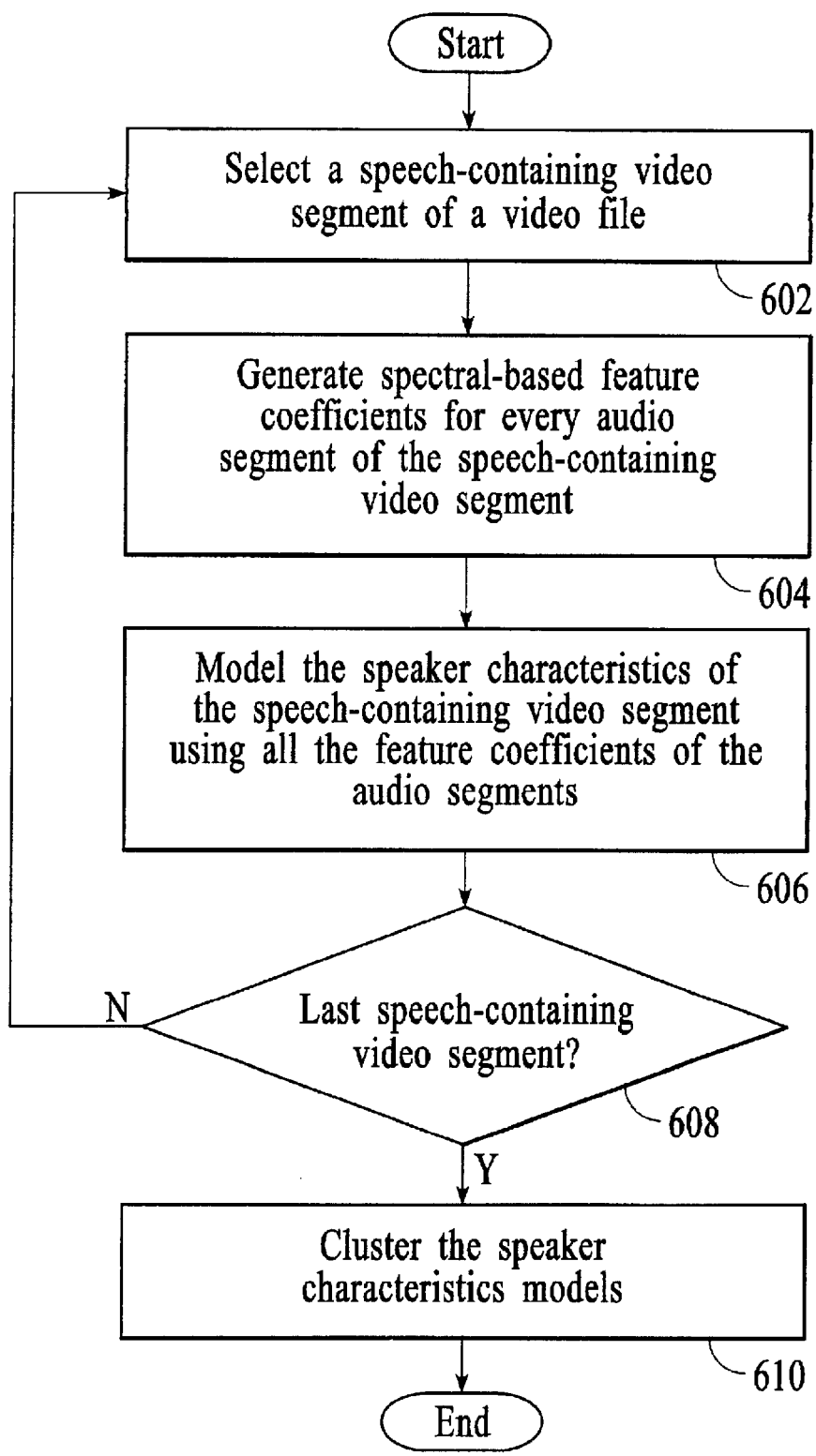
FIG. 6 is a process flow diagram of the operation of the speaker distinction module.

The overall operation of the speaker distinction module is described with reference to FIG. 6. At step 602, a speech-containing video segment of a video file is selected to be processed. Next, at step 604, spectral-based feature coefficients for every audio segment of the current speech-containing video segment are computed. In the exemplary embodiment, MFCCs are computed. At step 606, the speaker characteristics of the speech-containing video segment are modeled using all the computed feature coefficients of the audio segments in the video segment. In the exemplary embodiment, the speaker characteristics of the speech-containing segment are modeled by computing a Gaussian mixture density value. Next, at step 608, a determination is made whether the current speech-containing video segment is the last speech-containing video segment of the video file. If so, the process proceeds to step 610. However, if the current speech-containing video segment is not the last speech-containing video segment, the process proceeds back to step 602, at which the next speech-containing video segment is selected to be processed.

Next, at step 610, the speaker characteristics models, e.g., the Gaussian mixture density parameters, are clustered using a clustering algorithm to associate the speech-containing video segments based on speaker characteristics. Thus, speech-containing video segments having common speaker characteristics can be associated together as video segments containing speech from a single speaker. The association of the speech-containing video segments based on speaker characteristics can then be used to index the given video file. In addition, other video event indices, such as video scenes and video shots, can be used to further index the given video file to provide a more meaningful indexed structure.

Figure 7:
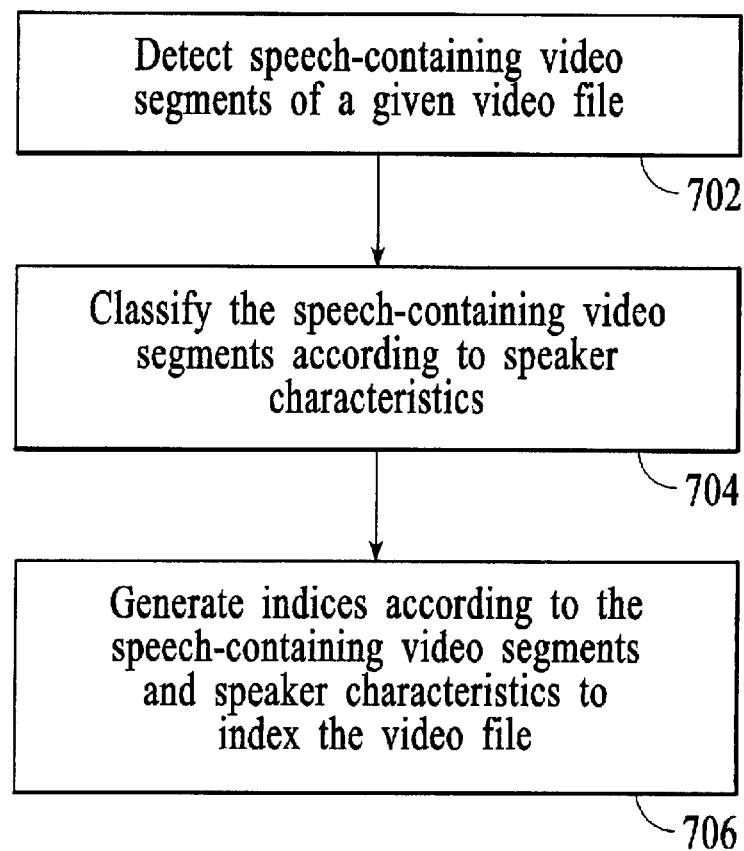
FIG. 7 is a process flow diagram of a method of indexing video files in accordance with an exemplary embodiment of the present invention.

A method of indexing video files in accordance with an exemplary embodiment of the invention is described with reference to the process flow diagram of FIG. 7. At step 702, video segments of a given video file that contain speech are detected. In the exemplary embodiment, the speech-containing video segments are detected by screening audio portions of the video file using energy values, zero-crossing rates and spectrums of the audio portions. However, other speech detection techniques may be used to detect the speech-containing video segments. Next, at step 704, the speech-containing video segments are classified according to speaker characteristics of the speech contained in the video segments. At step 706, indices of locations in the video file are generated according to the detected speech-containing video segments and the speaker characteristics to index the video file.

Although a specific embodiment of the invention has been described and illustrated, the invention is not to be limited to the specific forms or arrangements of parts so described and illustrated. The scope of the invention is to be defined by the claims appended hereto and their equivalents.

What is claimed is:

1. A method for indexing multimedia data comprising:
   detecting particular multimedia segments of said multimedia data, said particular multimedia segments containing predefined audio content;
   classifying said particular multimedia segments according to audio characteristics of said predefined audio content in said particular multimedia segments; and
   generating indices of locations of said particular multimedia segments in said multimedia data, said indices including classification information of said particular multimedia segments according to said audio characteristics.

2. The method of claim 1 wherein said predefined audio content includes speech.

3. The method of claim 2 wherein said audio characteristics of said predefined audio content include speaker characteristics.

4. The method of claim 1 further comprising a step of generating spectral-based feature coefficients for audio portions of said particular multimedia segments.

5. The method of claim 4 wherein said step of generating said spectral-based feature coefficients includes generating mel-frequency cepstral coefficients.

6. The method of claim 4 further comprising a step of modeling said spectral-based feature coefficients of said particular multimedia segments into audio models.

7. The method of claim 6 wherein said step of classifying said particular multimedia segments includes clustering said audio models of said particular multimedia segments.

8. The method of claim 1 wherein said step of detecting said particular multimedia segments includes comparing energy values of audio portions of said multimedia data to an energy threshold.

9. The method of claim 1 wherein said step of detecting said particular multimedia segments includes comparing variance values of zero-crossing rates and amplitude span values of said zero-crossing rates for audio portions of said multimedia data to corresponding thresholds.

10. The method of claim 1 wherein said step of detecting said particular multimedia segments includes checking for harmonic speech relations in peaks of spectrums for audio portions of said multimedia data.

11. A system for indexing multimedia data comprising:
    a detector configured to detect particular multimedia segments of said multimedia data, said particular multimedia segments containing predefined audio content;
    a module configured to classify said particular multimedia segments according to audio characteristics of said predefined audio content in said particular multimedia segments; and
    a processor configured to generate indices of locations of said particular multimedia segments in said multimedia data, said indices including classification information of said particular multimedia segments according to said audio characteristics.

12. The system of claim 11 wherein said predefined audio content includes speech.

13. The system of claim 12 wherein said audio characteristics of said predefined audio content include speaker characteristics.

14. The system of claim 11 wherein said module includes a feature generator configured to generate spectral-based feature coefficients for audio portions of said particular multimedia segments.

15. The system of claim 14 wherein said feature generator is configured to generate mel-frequency cepstral coefficients.

16. The system of claim 14 wherein said module includes a modeling unit configured to model said spectral-based feature coefficients of said particular multimedia segments into audio models.

17. The system of claim 16 wherein said module includes a clustering unit configured to cluster said audio models of said particular multimedia segments to classify said particular multimedia segments.

18. The system of claim 11 wherein said detector includes an energy analyzer configured to compare energies of audio portions of said multimedia data to an energy threshold.

19. The system of claim 11 wherein said detector includes a zero-crossing analyzer configured to compare variance values of zero-crossing rates and amplitude span values of said zero-crossing rates for audio portions of said multimedia data to corresponding thresholds.

20. The system of claim 11 wherein said detector includes a spectrum analyzer configured to check for harmonic speech relations in peaks of spectrums for audio portions of said multimedia data.

21. A method for indexing video data comprising:
    detecting video segments of said video data that contain speech content;
    associating said video segments based on speaker characteristics of said speech content in said video segments; and
    generating indices corresponding to locations of said video segments in said video data, said indices including said speaker characteristics of said speech content in said video segments.

22. The method of claim 21 further comprising a step of generating spectral-based feature coefficients for audio portions of said video segments.

23. The method of claim 22 wherein said step of generating said spectral-based feature coefficients includes generating mel-frequency cepstral coefficients.

24. The method of claim 23 further comprising a step of modeling said spectral-based feature coefficients of said video segments into speaker models.

25. The method of claim 24 wherein said step of associating said video segments based on said speaker characteristics includes clustering said speaker models of said video segments.

26. The method of claim 21 wherein said step of detecting said video segments includes comparing energy values of audio portions of said video data to an energy threshold.

27. The method of claim 21 wherein said step of detecting said video segments includes comparing variance values of zero-crossing rates and amplitude span values of said zero-crossing rates for audio portions of said video data to corresponding thresholds.

28. The method of claim 21 wherein said step of detecting said video segments includes checking for harmonic speech relations in peaks of spectrums for audio portions of said video data.

* * * * *